United States Patent [19]

Bettencourt et al.

[11] 4,414,792
[45] Nov. 15, 1983

[54] HEIGHT CONTROL FOR AGRICULTURAL MACHINE

[75] Inventors: Darryl G. Bettencourt, Lodi; Akos I. Szoboszlay, San Jose, both of Calif.

[73] Assignee: Blackwelders, Rio Vista, Calif.

[21] Appl. No.: 363,642

[22] Filed: Mar. 30, 1982

[51] Int. Cl.³ .......................................... A01D 46/20
[52] U.S. Cl. .............................. 56/10.2; 56/DIG. 15
[58] Field of Search ............... 56/10.2, 10.5, DIG. 15, 56/208

[56] References Cited

U.S. PATENT DOCUMENTS

| | | | |
|---|---|---|---|
| 3,094,693 | 6/1963 | Taylor | 56/DIG. 15 |
| 3,181,618 | 5/1965 | Miller | 172/6 |
| 3,540,028 | 11/1970 | Love | 340/267 |
| 3,563,013 | 2/1971 | Elfes | 56/20 |
| 3,623,301 | 11/1971 | Hofer | 56/10.4 |
| 3,906,710 | 9/1975 | Pask | 56/10.2 |
| 3,908,345 | 9/1975 | Oni et al. | 56/208 |
| 4,077,488 | 3/1978 | Bennett, et al. | 180/98 |
| 4,087,783 | 5/1978 | Steffen | 340/52 R |
| 4,124,970 | 11/1978 | Bernhardt | 56/10.2 |
| 4,130,980 | 12/1978 | Fardal et al. | 56/DIG. 15 |
| 4,136,508 | 1/1979 | Coleman et al. | 56/208 |
| 4,171,606 | 10/1979 | Ziegler et al. | 56/10.2 |
| 4,204,383 | 5/1980 | Milliken, Jr. | 56/DIG. 15 |
| 4,211,057 | 7/1980 | Dougherty et al. | 56/10.2 |
| 4,228,636 | 10/1980 | Homburg | 56/10.2 |

FOREIGN PATENT DOCUMENTS

| | | |
|---|---|---|
| 778092 | 2/1968 | Canada . |
| 2532407 | 3/1977 | Fed. Rep. of Germany . |
| 540597 | 4/1973 | U.S.S.R. ............................. 56/208 |

Primary Examiner—Paul J. Hirsch
Attorney, Agent, or Firm—Owen, Wickersham & Erickson

[57] ABSTRACT

Method and apparatus for keeping a machine member of an agricultural machine at a substantially constant height above a field during its movement through the field. A wheel-supported main frame supports, for vertical movement, an auxiliary frame carrying the machine member and also carrying an ultrasonic transducer spaced at a constant distance away from the machine member. The machine member is set at an initial position relative to the surface of said field. Thereafter the position of said machine member relative to said main frame is determined, and an electrical signal corresponding thereto generated. The height of said transducer above the field is determined ultrasonically and an electrical signal corresponding thereto generated. From these electrical signals the amount and direction of divergence of the actual position of the machine member relative to the field surface from its initial set position is determined, and an electrical correction signal corresponding thereto is produced, causing movement of the auxiliary frame relative to the main frame.

8 Claims, 10 Drawing Figures

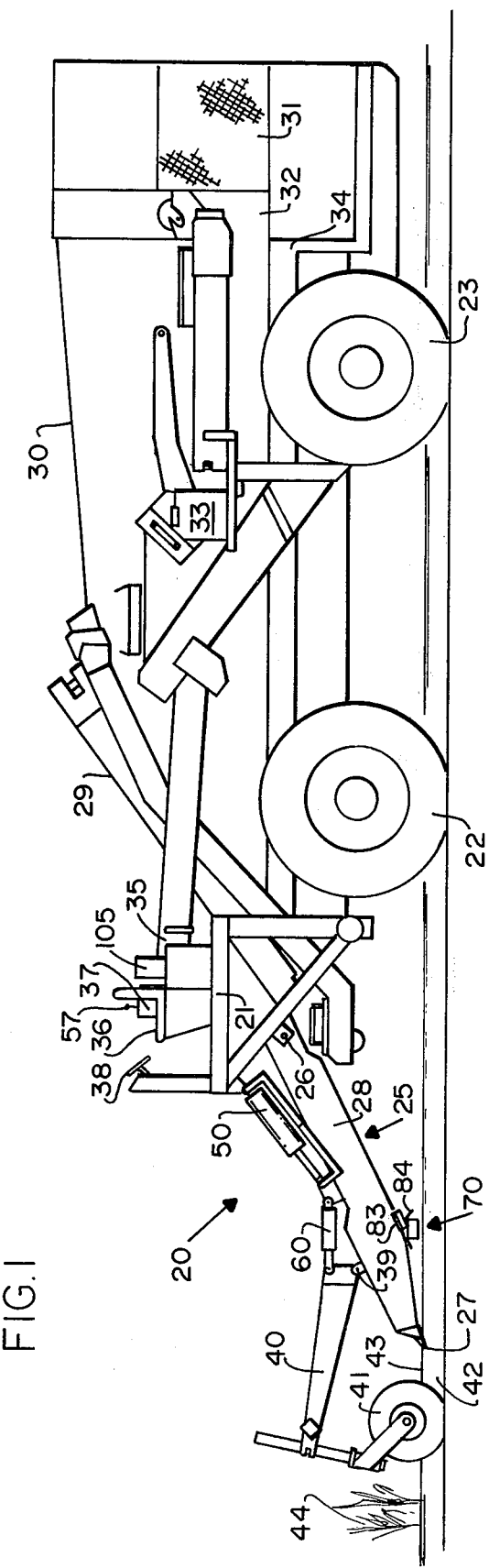

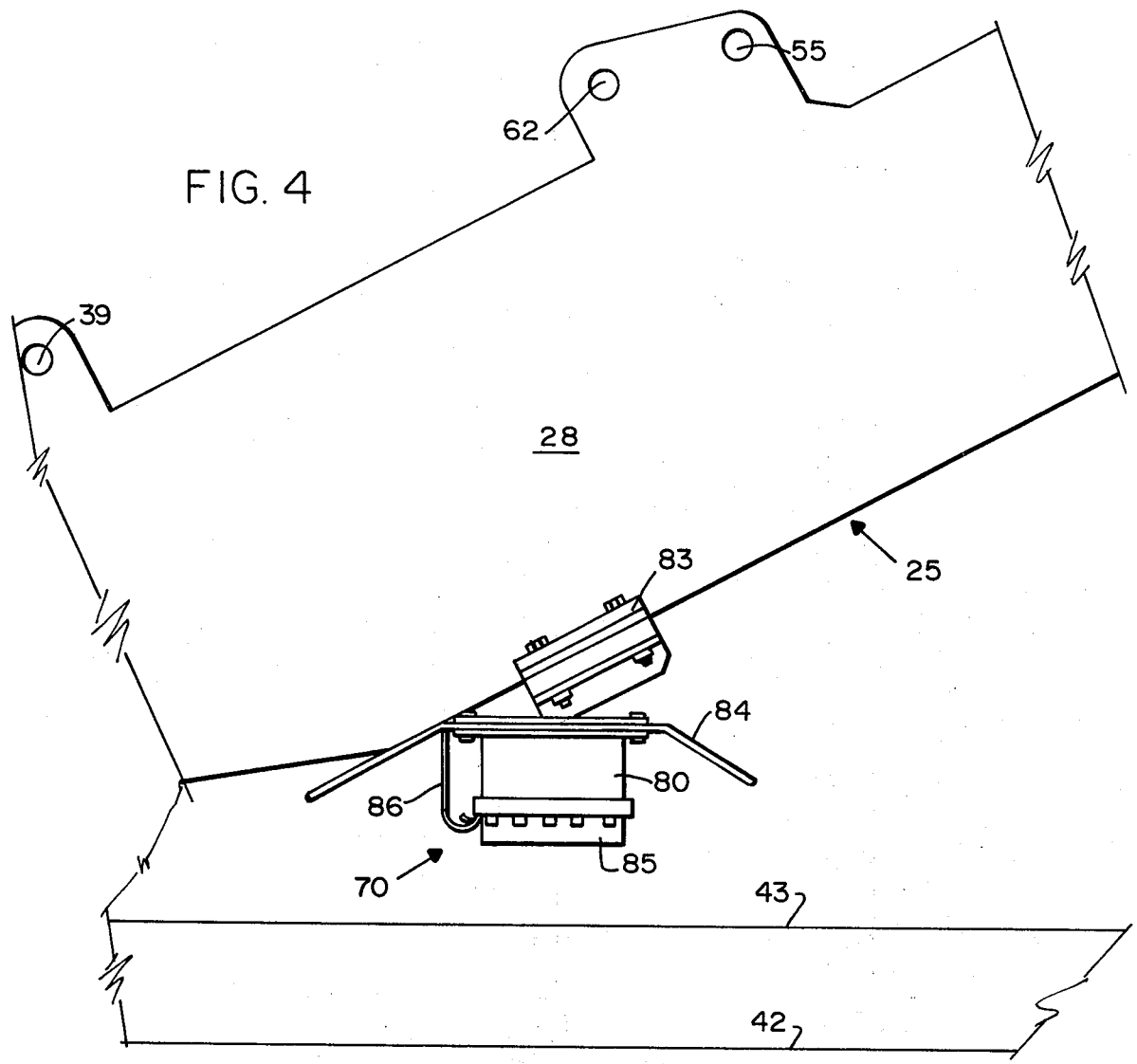
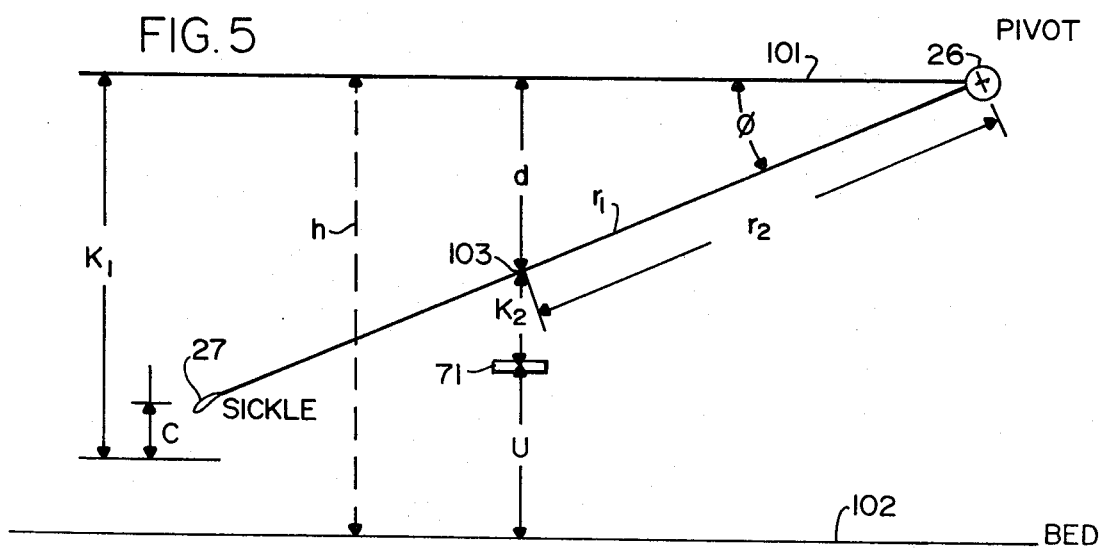

HEIGHT CONTROL FOR AGRICULTURAL MACHINE

This invention relates to improvements in agricultural machines. It relates particularly to method and apparatus for keeping a machine member at a substantial height above the field in which the machine is operating. As an example, it applies to method and apparatus for keeping the plant-stem-severing device at the front end of a tomato harvester at a constant distance from the surface of the soil bed in which the plant is growing, whether the device be above or below ground.

BACKGROUND OF THE INVENTION

Agricultural machines, such as tomato harvesters, have in the past had to rely to a distressing degree upon the skill of the machine operator. Some machine operators were extremely experienced and capable and were able to produce a good yield of tomatoes, but other operators, less experienced or less particular, failed to recover a large proportion of the tomatoes to be harvested. Also, we have found that even careful and capable operators have been under strain while operating the harvester and that this has often required rest stops, or else deterioration in the quality of the operation.

It is, of course, extremely desirable that the machine be less dependent upon the skill and experience of the operator. Therefore, it is an object of the present invention to enable an approximately maximum result even with an inexperienced operator. This is accomplished by providing a tomato harvester in which the severing sickle or blade is automatically controlled so that it always operates at the desired optimum position to which it is set.

Again, even an experienced operator has some difficulty in determining the depth at which the blade is operating, especially when the blade or sickle is somewhat underground. It is remarkable that these operators have been able to do as well as they have done, since their vision has been obscured by the tomato plants that were being cut and transported from the severing sickle up an elevator to the shaker.

With the present invention, the blade is automatically kept in the position where the operator would desire it to be, so that the operator basically needs only to steer the machine accurately and to regulate its forward speed. These two things are relatively easily to do, and to do properly.

A surprising result of the invention is that the tomato harvest is substantially increased while the strain on the operator is reduced and while enabling nearly anyone who can properly control a tractor to be a good operator, for with this invention nearly anyone can learn to be a good harvester operator, usually in just a few minutes. About all the operator needs to do, other than to steer and regulate the speed of the vehicle, is to lift the sickle device out of the ground at the end of each row by an uncritical amount, turn the machine around and align it with the next row to be harvested, for then the harvester, when actuated to do so, automatically relocates the blade at the proper depth.

Another surprising result of the invention is that it reduces the amount of dirt picked up by the harvester during harvesting. It has been found that when the sickle is kept at the proper depth, the number of clods of dirt sent up the elevator is drastically reduced. Moreover, the sickle blade can be so accurately controlled that it can be operated somewhat higher than heretofore and yet produce very successful results; as a result of this higher position less dirt is lifted toward and upon the pick-up portion of the harvester, yet the number of tomatoes recovered is not substantially less, if any less.

When a harvester sickle or blade is cutting underground, it produces a ground swell which, when observed underneath the harvester, appears as a ground wave traveling with the tractor, so that with respect to the tractor it is substantially a standing wave. The dirt, as viewed with respect to the field, is lifted above ground and then settles back onto it and into it at a level slightly higher than before it was disturbed. It is very important in operating a tomato harvester to make sure that the cutting blade does not begin to get gradually deeper, because, if it does, it tends very soon to produce a kind of action in which the blade dives into the ground and thereby stops completely the operation of the harvester. This blade-diving is one trouble that inexperienced operators have heretofore had. In order to avoid this, a cautious operator may sometimes operate with the blade too shallow, thereby losing many of the tomatoes that should be recovered.

In maintaining the desired depth it is, of course, important that the actual depth at which the blade is operating (or its height aboveground where that would be desirable) be continually known, so that the controls which govern blade or sickle placement can respond by comparing that actual position with the desired position and can bring the two into consonance. Another object of the invention is to enable this to be done.

Another extremely desirable result, which has been achieved by the invention, is that the harvester can be operated in fields in which there has been a recent rain, at least in fields where the rain has not made the soil into mud for any substantial depth. As long as the mud is only at or near the surface, the present machine can operate without bringing mud in significant amounts up onto the harvester's elevator.

It is important that mud and dirt not pass through the harvester and into the collected tomatoes, because the buyers (canners, where the crops are grown for canning) pay a much lower price per ton of tomatoes when the tomatoes are covered with mud and also when a substantial portion of the load is dirt or mud. Dirt in the load not only reduces the weight of tomatoes compared with the total weight, but also necessitates cleaning the tomatoes; mud makes the situation even worse. Therefore, growers are very eager to keep the harvested tomatoes clean. Heretofore this has usually meant not harvesting if the field was even slightly muddy and has required expensive devices to control the flow of dry dirt. The depth-control device of this invention, which costs about the same as do the devices controlling dirt flow, can be used either with or without the dirt control device. Considerable money can be saved when the purchaser need not buy any dirt control device, as he need not when using the harvester of this invention.

SUMMARY OF THE INVENTION

The invention has both method and machine aspects. Broadly speaking, it includes a method for keeping a certain machine member of an agricultural machine at a substantially constant height above a field during its movement through the field. Such a machine has a wheel-supported main frame and an auxiliary frame carrying both the machine member and an ultrasonic distance-determining device spaced away from the machine member. The auxiliary frame is supported by the main frame for generally vertical or swinging movement in a vertical plane relative thereto. The new method comprises the following steps:

(1) setting the machine member at an initial position relative to the surface of the field, from which initial position the actual relative position of the machine member diverges somewhat, due to such things as field surface roughness, (2) determining the position of the machine member relative to the main frame and generating an electrical signal corresponding thereto, (3) determining ultrasonically the height of a certain point on the ultrasonic device above the field and generating an electrical signal corresponding thereto, (4) electronically calculating, from the electrical signal of the two preceding steps, the amount and direction of divergence of the actual position of the machine member, relative to the field surface, from its desired position relative thereto and producing an electrical correction signal corresponding thereto, and (5) moving the position of the auxiliary frame relative to the main frame in response to the correction signal, to bring the actual position toward conformity with the desired position.

The machine, broadly considered, is an agricultural machine for field use, in which it is important to keep a machine member at a substantially constant height above the field. Such a machine includes a wheel-supported main frame and an auxiliary frame carrying the machine member and supported by the main frame for generally vertical movement relative thereto. Lifting and lowering means enable lifting the auxiliary frame and its machine member relative to the main frame.

First transducer means determines the position of the machine member relative to the main frame and develops an electrical signal corresponding thereto.

Ultrasonic distance-determining means, secured to an underside of the auxiliary frame above and spaced from the machine member, includes a housing with electrostatic ultrasonic second transducer means connected to an electronic transmitter and an electronic receiver, for determining ultrasonically the height of the receiver above the field and for generating an electrical signal corresponding thereto.

The machine also includes means for setting the machine member at an initial position relative to the surface of the field. From that initial position the actual relative position of the machine member diverges, due to such things as field surface roughness.

The machine also comprises electronic calculation means electrically connected to the first and second transducer means and provided with constants relating to the geometry of the auxiliary frame, its mounting to the main frame, its lifting means, the machine member, and the location of the transducer. The calculation means then determines the amount and direction of divergence of the actual position of the machine member relative to the field surface from its desired position relative thereto, and it produces an electrical correction signal corresponding thereto. Correcting means responsive to the correction signal actuates the lifting and lowering means and thereby brings the actual position toward conformity with the desired position.

The invention may, for example, be applied to a tomato harvester that harvests tomato plants grown in rows along a series of elevated beds, each bed lying between a pair of furrows. In the harvester, an auxiliary frame known as a header frame is pivotally supported by a main frame generally forward thereof. At the forward and lowest edge of the header frame is a plant-stem-severing means such as a reciprocating sickle blade that is usually operated a short distance underground. The header frame also includes plant pickup and elevating means extending upwardly and rearwardly from the plant-stem-severing means.

Header-lifting means comprise a first power means connected to the main frame and to the header frame for swinging the header frame upwardly in a vertical plane about a pivot on the main frame; lowering the header is accomplished by gravity upon release of the power means. The power means may be a hydraulic cylinder-piston assembly, which is manually operated to raise the header to a desired height, at the end of each row, and the manual control is also used to place the valve for this assembly in a detented position where the header becomes free-floating during operation, and no reliance is made on this power means during operation of the harvester. First transducer means determines the instantaneous position of the header frame relative to the main frame and develops an electrical signal corresponding to that position.

An ultrasonic distance-determining device is secured to an underside of the header frame, above and to the rear of the plant-stem-severing means. The device includes a housing with an electrostatic ultrasonic second transducer means connected to an electronic signal corresponding to that height.

In such a harvester, there may also be a gauge frame pivotally supported by the header frame and having a pair of gauge wheels for riding in a pair of furrows between which each planting bed lies. A gauge-frame-lifting-and-lowering power device is mounted to both the header frame and the gauge frame for swinging the header frame in a vertical plane about a pivot on the header frame. An electrically actuated device, such as a solenoid valve, controls the operation of the gauge-frame-lifting-and-lowering power device, which may be a hydraulic cylinder, thereby raising or lowering the header frame relative to the gauge wheels, while the gauge wheels continue to ride on the ground in the furrows. The header is, during operation, placed in a free-floating condition, by placing the valve in a detented position. Thereafter, the gauge-frame's power device is used to set the header so that the plant-stem-severing means is at a desired height relative to the gauge wheels. Thereby, it also initially sets the plant-stem-severing means at a desired level relative to the surface of the bed. Subsequent adjustments of the header height are accomplished by the gauge-frame-lifting-and-lowering device, the header floating relative to the main frame.

An electronic calculating circuit, electrically connected to both the first and second transducer means, is provided with trigonometric and other constants relating to the relative positions of the header frame with its pivot, the plant-stem-severing means, and the transducers. This calculator then determines the divergence between the actual position of the plant-stem-severing means relative to the bed surface and its desired position relative thereto, and it produces an electrical correction signal corresponding thereto. This signal actuates a correcting device which, in turn, actuates the gauge-frame-lifting-and-lowering power means for bringing the actual position of the plant-severing means toward conformity with the desired position.

The ultrasonic height-determining device is fully described and claimed in a co-pending patent application, Ser. No. 363,644, filed Mar. 30, 1982. The ultrasonic device constitutes an electrostatic ultrasonic transducer electrically connected to a transmitter and to an associated receiver. The transmitter causes the transducer to send its ultrasonic signal vertically down to the ground, and this signal is reflected back up to the transducer and sent to the receiver, both of which are appropriately guarded from extraneous signals. The device includes a calibration bar which interrupts and reflects back a small segment of the ultrasonic signal. The time required between the sending and receiving of this signal segment is compared with the time required between the sending and receiving of the ground-reflected signal. The calibration bar is located at a known distance from the electrostatic transducer so that the transducer's distance from the ground is determined by the comparison of these two times. An electrical signal corresponding to that distance is sent to the calculating circuit.

The electronic calculating circuit may be any suitable such device properly structured to take the actual distance from the ground as determined by the ultrasonic device and compare it with the distance that corresponds with the desired setting of the cutting sickle or blade. From this, it determines the amount and direction of the divergence of the actual distance from the desired distance, being provided with suitable trigonometric and other constants that help to determine how much the header frame should be swung about its pivot in order to achieve correction. It then sends a correction signal to the power means that provides the needed correction. This will be explained in more detail below.

Other objects and advantages of the invention will appear from the drawings and descriptions of a preferred embodiment.

BRIEF DESCRIPTION OF THE DRAWINGS

FIG. 1 is a view in side elevation of a tomato harvester embodying the principles of the invention.

FIG. 2 is a view in front elevation of the same, with the pickup raised.

FIG. 4 is a similar further enlarged view of a portion of FIG. 3.

FIG. 5 is a diagram showing the various lengths and angles involved in the calculations to be made.

DESCRIPTION OF A PREFERRED EMBODIMENT

Figure 3:
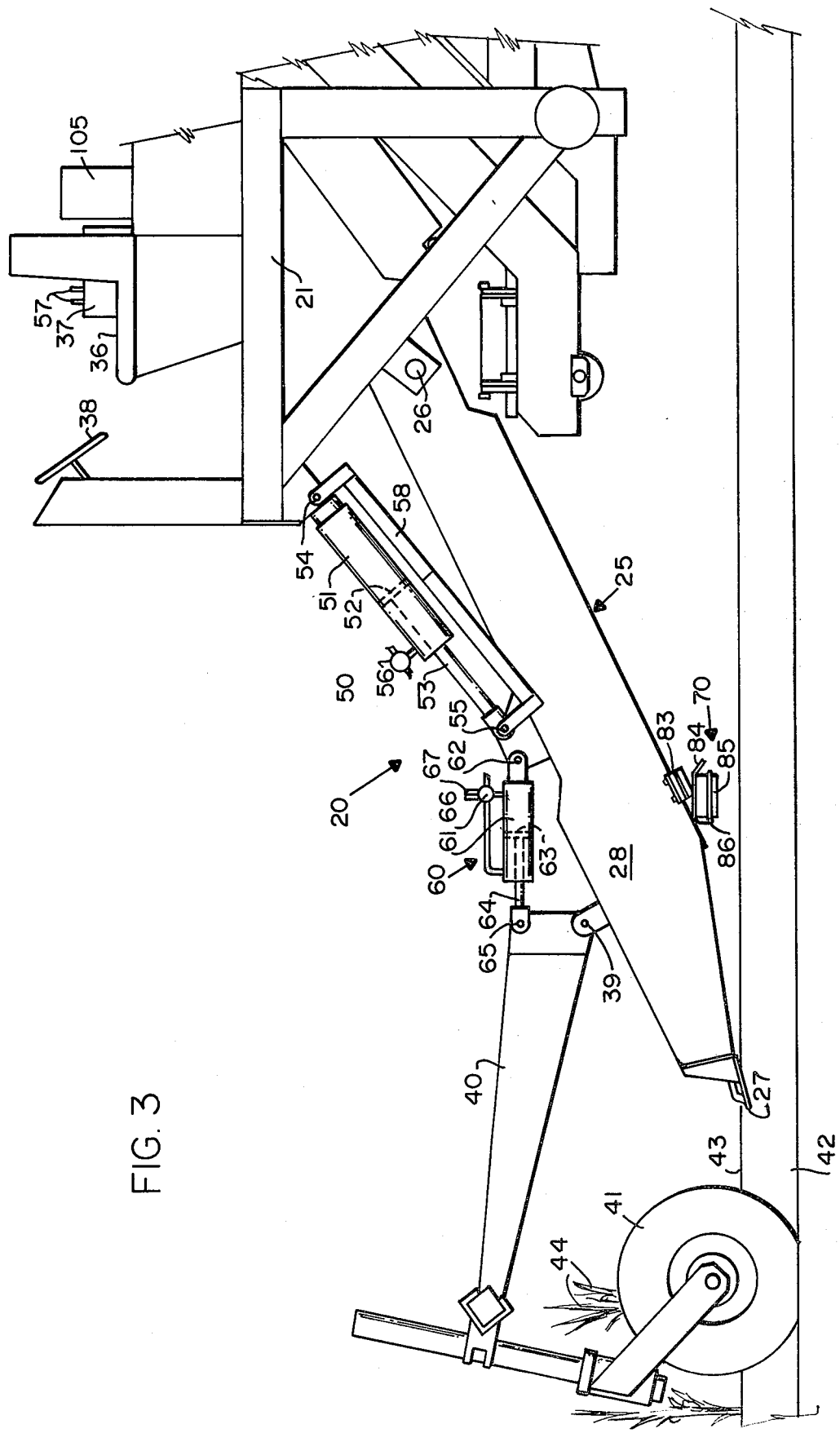
FIG. 3 is an enlarged view in side elevation of the front end of the tomato harvester of FIG. 1.

Although the device is applicable to other agricultural machines, and some portions of the device are applicable even elsewhere, the invention will be made clearer by a specific tomato harvester embodying the principles of the invention.

General description of the tomato harvester 20

(FIGS. 1 and 2)

The tomato harvester 20 may be generally like that shown in U.S. Pat. Nos. 3,986,561; 4,033,099; and 4,118,311. The harvester 20 has a main frame 21 carried on front wheels 22 and rear wheels 23. At the forward end of the main frame 21 is an auxiliary or header frame 25, which is mounted to the main frame 21 on pivots 26. A plant-stem-severing device 27 such as a blade or sickle is mounted on the front end of the header frame 25. The sickle 27 may be mounted for hydraulic operation, with a reciprocating blade moving relative to a stationary anvil. Whether it be a sickle or blade or in another form, the plant-stem-severing means 27 is used to cut off each tomato plant at a point above the root crown and below the first branches. The chosen point is usually a short distance underground.

When the tomato plant is cut off, it is carried up a pickup device or elevator 28, mounted on the header frame 25. The plant may be transferred to a second, steeper elevator 29 and it eventually reaches a shaking device 30, where the tomato plants are shaken to recover the tomatoes and discard the remainder of the vine or plant. The tomatoes may then be transported across the rear of the shaker 30 along conveyors 31 from which they are moved forwardly on a conveyor 32 on each side of the frame 21, where culls and trash are removed, as by a mechanical sorter 33 and workers standing on suitable platforms 34. The selected good tomatoes then go via a cross-conveyor 35 to a large trailer bin. The movement of the harvester 20 is controlled by a driver seated on a seat 36 and having a control console 37 as well as steering gear 38.

The header and gauge (FIGS. 1-3)

Mounted to the header frame 25 by pivots 39 is a gauge frame 40 having a pair of gauge wheels 41 rotatably mounted thereon. These gauge wheels 41 are in front of the header frame 25 and in furrows 42, one on each side of a bed 43 in which the tomato plants 44 are grown.

Suitable lifting means are provided for swinging up the header frame 25 about its pivot 26, relative to the main frame 21; downward movement is accomplished by release and by gravity. As shown in FIG. 3, this may be a hydraulic device 50 incorporating a cylinder 51, a piston 52, and a piston rod 53. The cylinder 51, for example, may be secured to the main frame 21 at a pivot 54, and the rod 53 may be secured to the header frame 25 by a pivot 55, or vice versa. A valve 56 which may be controlled by a manual control 57 (see FIG. 2) may send fluid into one side of the hydraulic cylinder 51 in order to raise the header frame 25 relative to the main frame 21, lowering being accomplished by release of hydraulic pressure and gravity. The manual control 57 is used for two things: (1) placing the hydraulic valve 56 in detented position (see FIG. 10) and (2) for lifting the header at the ends of rows.

Figure 10:
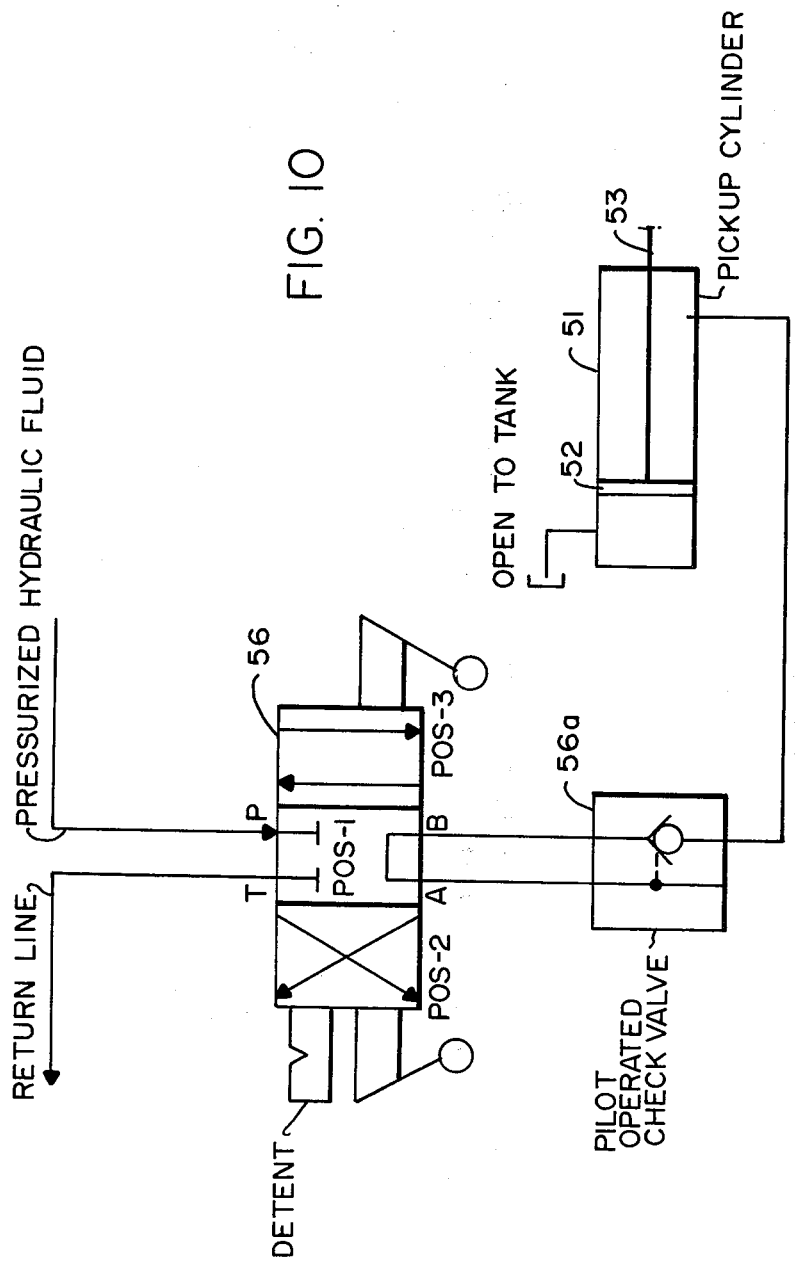
FIG. 10 is a hydraulic circuit diagram showing how the header is placed in a free-floating condition.

FIG. 10 shows that the valve 56 is a three-position four-way valve, having an inlet port P for pressurized hydraulic fluid, an outlet return-line port T, and ports A and B that are connected to a pilot-operated check valve 56a. In its first position, the port P is dead-ended, the port T is not connected to any other port, and the ports A and B are connected to each other. This position holds whatever pressure there is applied to the piston 52 in the cylinder 51.

In position two, the detented position, the port P is connected to the port A, the port B is connected to the port T, and the check valve 56a is opened. Thus, no pressure is exerted against the piston 52 in the rod side of the cylinder 51; since the opposite side of the cylinder is open to the return line, there is no pressure on either side of the piston 52, and the header 25 can float freely.

In position 3, the port P is connected to the port B, sending fluid to force the check valve off its seat and apply pressure to the rod side of the cylinder 51. The return port T is connected to the port A. The fluid on the rod side of the cylinder 51 therefore actuates the piston 52 to lift the header 25.

During actual harvesting, the valve 56 is in its detented position, and the header 25 is therefore in a free-floating condition. A telescoping assembly 58 follows the piston rod movement and is used in conjunction with a transducer 100 to indicate the amount of movement, which is proportional to the height of the sickle 27 relative to the main frame 21.

A similar hydraulic device 60 may be used to swing the header frame 25 and gauge frame 40 relatively to each other. This power device 60 may include a cylinder 61 secured at a pivot 62 to the header frame 25, a piston 63, a piston rod 64 secured to a pivot 65 on the gauge frame 40, a valve 66, and a solenoid 67 of the valve 66. Typically, the header frame 25 moves relative to the gauge wheel frame 40, since the gauge wheels 41 are preferably kept seated in the furrows 42, and the valve 56 is in the detented position so that the header 25 floats freely and does not oppose the adjustments. Thus, the solenoid 67 controls the height of the cutting-sickle 27 in relation to the ground, acting through the valve 66 and the device 60.

The ultrasonic device 70

Figure 6:
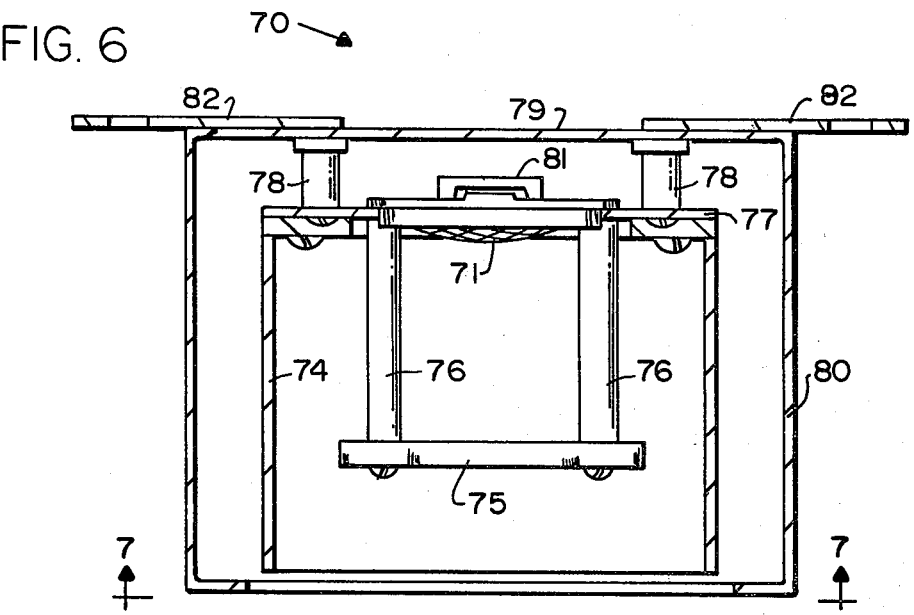
FIG. 6 is an enlarged view in elevation and in section of the ultrasonic device.
Figure 7:
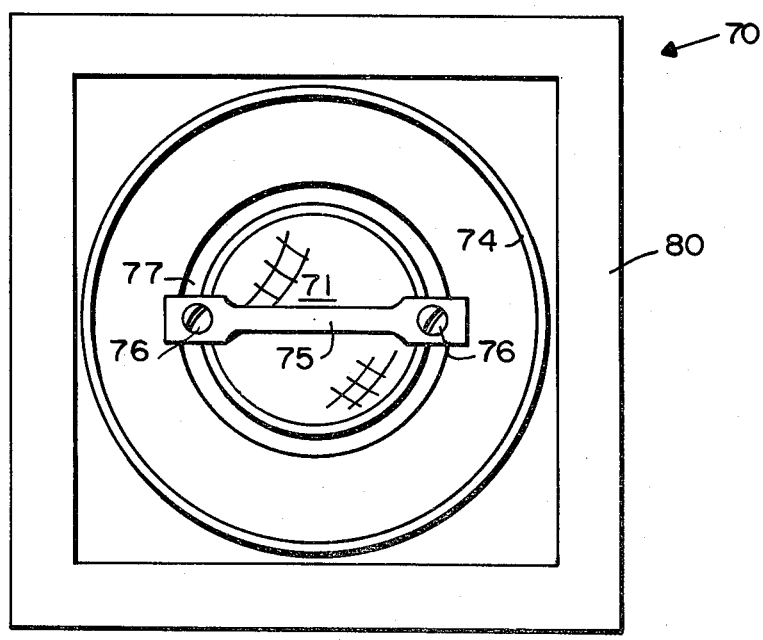
FIG. 7 is a bottom view looking up into the device of FIG. 6.

(FIGS. 6 and 7)

It will be evident from the description so far that it is not easy to determine visually the actual position of the sickle 27 to the bed 43, particularly when the sickle 27 is operating underground with tomato plants 44 pouring over the sickle 27 onto the elevator 28. Moreover, with the sickle 27 underground or even aboveground but close to the ground, measurement by instruments is difficult. Therefore, in the present invention the position is determined indirectly. In order to achieve this, an ultrasonic device 70 (see FIG. 6) is secured to the underside of the header frame 25 (see FIGS. 1-4). The ultrasonic device 70 includes an electrostatic transducer 71, which is electrically connected to an electronic transmitter 72 and to an electronic receiver 73, (see FIG. 8). The ultrasonic transducer 71 is mounted near the upper end of a cylindrical enclosure or waveguiding tube 74. Near the lower end of the enclosure 74 is mounted a calibration bar 75.

The ultrasonic apparatus 70 is mounted sufficiently far to the rear of the sickle 27 as to be an adequate height above it, so that an ultrasonic signal can be bounced off the ground and back. For this purpose there should be some significant space between the ground and the ultrasonic device 70 at all times. Thus, the sickle 27 and the ultrasonic device 71 are in fixed positions relative to each other, and to the header frame 25, but that they are located at different radii from the pivot point 26. Therefore the height above ground of the ultrasonic transducer 71 does not vary linearly with respect to the space between the sickle 27 and the ground surface. Rather, trigonometric functions are involved, as will be discussed below in connection with FIG. 5.

The transducer 71 employs an electrical signal from the transmitter 72 (see FIG. 8) and uses electrostatics to generate an ultrasonic pulse. The transmitter 72 generates a single pulse in the form of a square wave which the electostatic transducer 71 (e.g. one made by Polaroid for its cameras) transforms into an ultrasonic pulse. Part of the energy from this pulse goes to the ground and is reflected back to the transducer 71, whence an electrical pulse is sent to the receiver 73. A smaller part of the pulse energy goes only to the calibration bar 75 and is reflected back to the transducer 71 from there. The distance of the calibration bar 75 from the transducer 71 is determined by a pair of spacers 76 that support the bar 75 and are themselves supported by a top panel 77 which supports the transducer 71. The reflection from the bar 75 returns to the transducer 71 much more quickly than the reflection from the ground, the times being proportional to the distance from the transducer 71. The electronic circuit calculates the distance from the transducer 71 to the ground as a multiple of the distance to the ground from the transducer 71 to the calibration bar. The transducer 71, on receipt of its signals, produces an electrical signal sent to the receiver 73. The time delay between the signal from the bar 75 and that from the ground corresponding to the vertical distance of the transducer 71 above the ground.

The panel 77 may be itself supported by screws 78 securing it to a top wall 79 of an enclosure 80. The wave guide tube 74 is preferably round, but the enclosure 80 may be square or other suitable shape. Additional support for the transducer 71 may be provided by a clamp 81 which has ends secured to the enclosure 80. The top wall 79 of the enclosure 80 may be welded to plates 82 that are secured to a clamp assembly 83 (see FIG. 4) which is itself secured to the header frame 25. A shield 84 (see FIGS. 2 and 4) diverts away vines that may hang down from the elevator 28. A normally open lid 85 (see FIG. 3) may, when closed, protect the assembly 70 when the machine 20 is being hosed down, a spring 86 helps to keep the lid 85 available.

Figure 8:
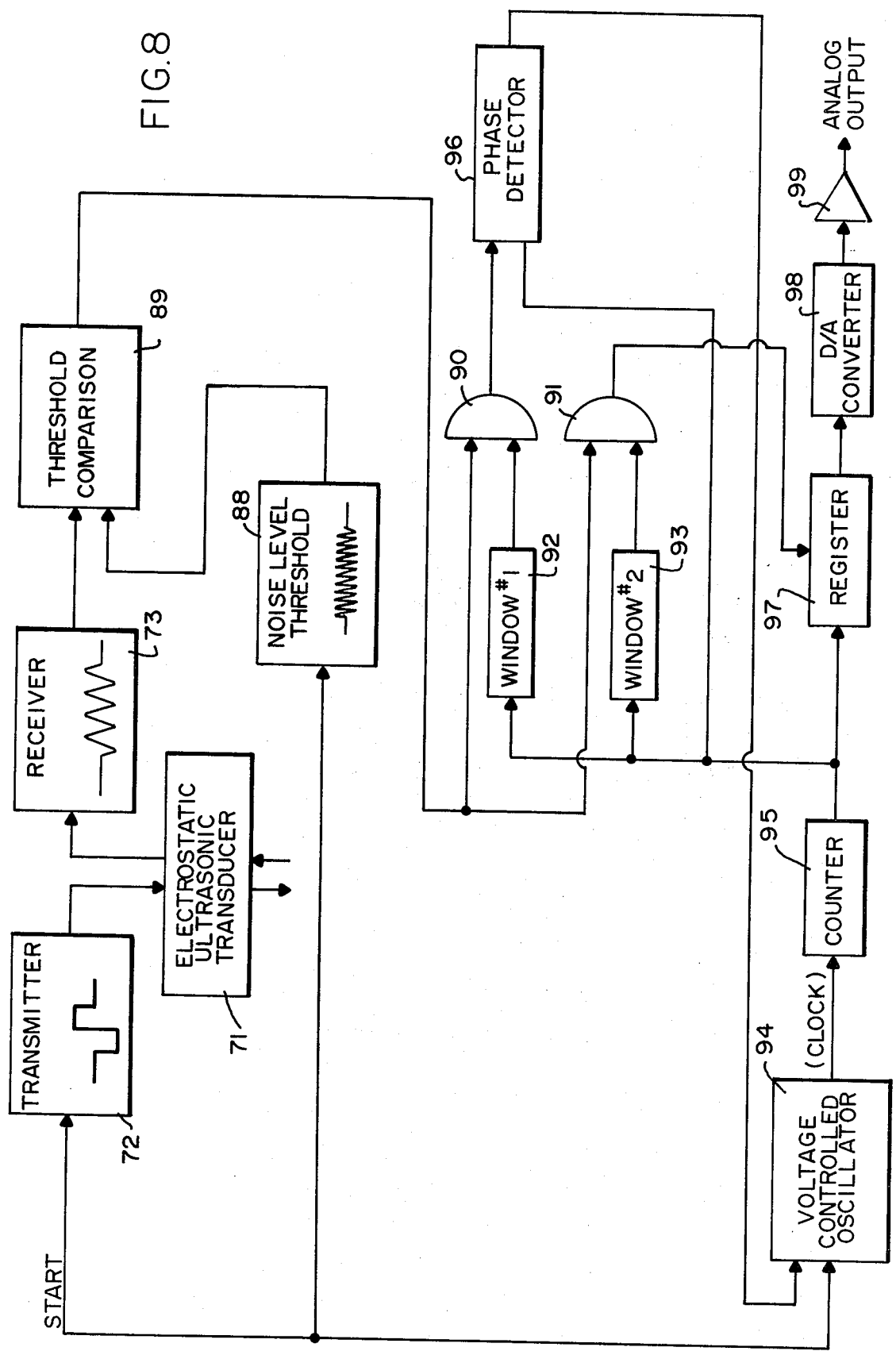
FIG. 8 is a block circuit diagram for the distance determining circuit.

The distance-determining circuit (FIG. 8)

As shown in FIG. 8, the electronic transmitter 72 (which may be any of several types of appropriate sub-circuits) generates a single-pulse square wave and actuates the transducer 71 to do so too with an ultrasonic pulse. The reflections, first, from the bar 75 and, second, from the ground are converted into electrical wave trains and sent to the receiver 73. The single pulse results in a short series of reflected oscillations that are no longer square. For use in determining the time lapse between the first and second reflections, it is desired to take into account only the very first such wave of each reflection. To eliminate noise, a noise level threshold is decided on and a circuit 88 therefore is connected to a circuit 89 enabling threshold comparison between that threshold and the received pulse reflections, the first wave having amplitude greater than the threshold marking the critical time. The resultant first waves then are sent to first and second AND gates 90 and 91. Each of these gates is provided with a suitable window circuit 92 or 93, which are opened at separate spaced-apart times. The first window 92 is open only from a time very little earlier than the earliest time at which the first reflection could come to a short time past the latest time it could occur. The second window 93 does not open until a significant long interval thereafter, a time representing the closest time at which the ground reflection could possibly be received, and it closes after the longest possible time to initiate and receive such a reflection.

A voltage-controlled oscillator 94 generates a series of clock pulse and sends them to a counter circuit 95. If everything acts at the normal time interval, the first reflection reaches the threshold comparator 89 at a particular count from the counter 95, e.g. at count 256. If it reaches there at an earlier count, say 253, then the counter 95 is too slow, and the oscillator 94 should be somewhat speeded up proportionally. If this signal occurs at a later count, say 259, it would be too fast, and the oscillator 94 should be slowed down proportionally. This is done with the aid of a phase detecting circuit 96, the inlet for which is connected to the first AND gate and to the counter 95 output, and the output from the phase detector 96 is connected back to the oscillator 94, thereby making any needed adjustment, due to variance from the standard temperature, for example.

The corrected counter 95 continues to send pulses to a register circuit 97 which receives the pulse signal from the second AND gate 91, thereby actuating the register 97 at the count when the ground reflection signal is received and sent to the second AND gate 91, e.g. at a count of 5360.

When the pulse signal from the second AND gate 91 actuates the register 97, the information from the counter 95 (which is exactly proportional to distance) is stored in the register 97, for example, when the bar 75 is exactly ten centimeters from the transducer 71, $$\frac{\text{count } 256}{10 \text{ cm}} = \frac{\text{count } 5360}{\text{distance to target in cm.}}$$

$$\text{Distance to target} = \frac{5360}{25.6} \text{ cm.}$$

$$= 209.375 \text{ cm.}$$

The register 97 may, if desired, then send this distance in digital form to a digital-to-analog converter 98, which may send its output to an amplifier 99, from which comes an amplified analog output.

The use of the electrostatic transducer 71 enables one to eliminate most of the circuitry that would be required when a crystal transducer is used to produce the ultrasonic pulse.

Basically, the invention thus determines the height of the ultrasonic transducer 71 above ground, and then sends its analog output 99 to a calculating circuit.

Setting the desired sickle position

The device also includes setting means for initially locating the sickle 27 relative to the main frame 21 and determining this initial location to correspond as exactly as possible to the desire relative position of the sickle 27 to the ground surface, which may be, for example, one inch below ground. The present invention then provides a comparison between the actual sickle distance at any moment and the desired or set distance.

Setting may be done by the manual control 57 (FIGS. 1-3) manually actuating the valve 56 into a detented position (see FIG. 10) to put the header 25 into a freely floating condition relative to the main frame 21, and then actuating the solenoid 67 for the valve 66, thereby to move the header frame 25 relatively to the main frame 21 and to the gauge frame 26. Comparisons between the actual and desired heights of the sickle 27 are done by the telescoping device 58 and an electrical comparison described below. Thus, the sickle 27 can be changed in its position by energizing the solenoid 67 to actuating the valve 66 to move the header frame 25 relative to the gauge wheel frame 40 and, as a result, relative to the main frame 21. The cylinder pressure then acts through horizontal, or substantially horizontal, action by the piston 63 and rod 64. This will be better understood by a consideration of the function diagram, FIG. 9 described below.

Conversion of transducer-to-ground distance to sickle-to-ground distance (FIG. 5)

The diagram, FIG. 5, shows an important feature of automatic height control. Since the electrostatic transducer 71 cannot be located at the sickle 27 and since the sickle 27 swings about the pivot 26 rather than moving vertically, certain calculations are needed for this purpose. They also apply to a transducer 100 for indicating the relative position of the telescoping member 58 corresponding to the position of the header 25 relative to the main frame.

Let the horizontal line 101 represent the vertical height of the pivot and the horizontal line 102 represent the bed level, which is theoretically parallel to the line 101. The vertical distance between them = h.

Let the sickle height at any time be $K_1 - C$, where $K_1$ is a constant vertical distance, and C is the amount by which the sickle 27 is above or below the level at the bottom of $K_1$.

Let $\phi 0$ be the angle between the line 101 and the header's longitudinal axis 26-27, from the pivot 26 to the sickle 27.

The ultrasonic transducer 71 is located at a distance U above the bed 102 and at a distance $K_2$ below the axis 26-27. A point 103 on the axis 26-27 that is vertically above the transducer 71 is a distance d below the line 101.

Let $r_1$ = the distance from the pivot 26 to the sickle 27
$r_2$ = the distance from the pivot 26 to the point 103.

Then:

$$d = r_2 \sin \phi$$

$$K_1 - C = r_1 \sin \phi$$

$$\therefore d = \frac{r_2}{r_1}(K_1 - C).$$

Since $$h = d + K_2 + U,$$

$$h = d + U + K_2$$

$$= U - \frac{r_2}{r_1}C + \left(K_1 \frac{r_2}{r_1} + K_2\right)$$

$K_1 \frac{r_2}{r_1} + K_2$ can be termed "system offset", and then

-continued $$h = U - \frac{r_2}{r_1} C + \text{system offset.}$$

The desired sickle height=actual bed height h±height control setting.

There is a slight error for U due to the pivoting of the header frame 25. This is $$U_{max}\left(1 - \cos\left(\frac{\phi_1 - \phi_2}{2}\right)\right),$$

where
$\phi_1$=largest angle of $\phi$ used in practice
$\phi_2$=smallest angle of $\phi$ used in practice.

This error further can be included or can be neglected since it is very small.

Figure 9:
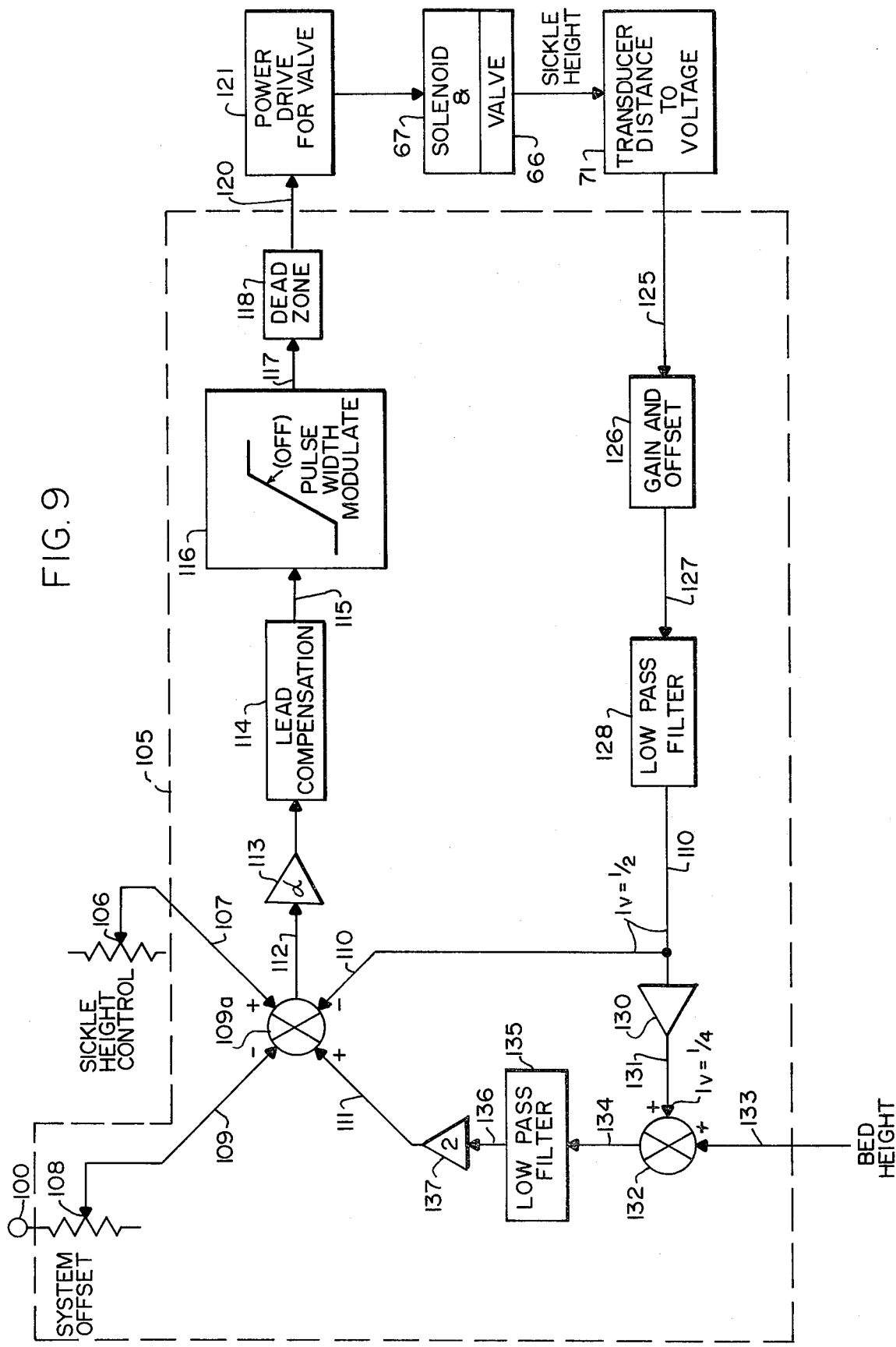
FIG. 9 is a function diagram for the operation of the invention.

The function diagram (FIG. 9)

The control 100 actuates a circuit mostly inside a control box 105, shown in FIGS. 1-3 near the seat 36. Now see FIG. 9, which is a function diagram, not a circuit diagram. For the initial setting of the height of the sickle 27, the control 57 sets a potentiometer 106 outside the control box 105, sending a voltage 107 into the control box 105. This potentiometer 106 and its voltage 107 correspond to the desired sickle height. A variation of that height, or 37 system offset" is indicated by another potentiometer 108 expressed in terms of a potentiometer signal or voltage 109. This voltage 109 is shown in FIG. 9 as a negative signal; it may be positive, depending on the direction of the variance. The voltages 107 and 109 are added at 109a to two other voltages 110 and 111, whose significance is explained below, to produce a summed voltage 112.

The voltage 112 is amplified by an amplifier 113 and modified by a predetermined lead compensation circuit 114.

The resultant voltage 115 has its pulse width modulated at 116 and then its modulated voltage 117 goes to a dead zone circuit 118 that reduces oscillations, or in other words prevents the sickle 27 for trembling due to insignificant distance changes from the ground to the transducer 71. From there the resultant signal 120 is given to a power drive 121 for driving the solenoid 67 for the valve 66. This acts to move the header 25 and the sickle 27 in a desired direction and by a desired amount, which is often modified before the amount is fully effected.

The sickle height (see FIG. 5) is read by the transducer 71, the sickle distance relative to ground being converted to a voltage 125, to which gain and offset 126 are applied to give a voltage 127. A low pass filter 128 removes A-C ripple and noise from the voltage 127 to give the voltage 110 corresponding to ½ volt per inch of sickle height or depth. This voltage 110 is fed to the summation point 109a referred to earlier.

The voltage 110 is also sent to an amplifier 130 which adjusts it by a factor ($r_2/2r_1$)
where $r_2$=the radius from the pivot 26 to the ultrasonic transducer 71 (see FIG. 5).
and $r_1$=the radius from the pivot 26 to the sickle 27.

The amplified signal 131, at 1 volt=¼″ height, corresponds to the vertical distance from the pivot 26 to the ultrasonic transducer 71, and this is applied to a junction 132 as a positive signal.

A voltage 133 corresponding to the bed height after the sickle 27 passes through is added to the voltage 131 to produce a voltage 134, which is passed through a low-pass filter 135, giving a voltage 136. An amplifier 137 doubles the value of the voltage 136, and the resultant voltage 111 is added to the voltages 107, 109, and 110.

This is the function of the calculator circuit. It can be achieved by any of many well know circuit combination and anyone skilled in this art can do it from the functional diagram.

To those skilled in the art to which this invention relates, many changes in construction and widely differing emodiments and applications of the invention will suggest themselves without departing from the spirit and scope of the invention. The disclosures and the descriptions herein are purely illustrative and are not intended to be in any sense limiting.

We claim:

1. A method for keeping a machine member of an agricultural machine at a substantially constant height above a field during its movement through the field, said machine having a wheel-supported main frame and an auxiliary frame carrying said machine member and an ultrasonic transducer spaced at a constant distance away from said machine member, said auxiliary frame being supported by said main frame for generally vertical movement relative thereto, comprising:

setting said machine member at an initial position relative to the surface of said field, from which initial position the actual relative position of said machine member tends to diverge, determining the position of said machine member relative to said main frame and generating an electrical signal corresponding thereto, determining ultrasonically the height of said transducer above the field and generating an electrical signal corresponding thereto, calculating, from the electrical signals of said two determining steps, the amount and direction of divergence of said actual position of said machine member relative to the field surface from its initial position relative thereto and producing an electrical correction signal corresponding thereto, and moving the position of said auxiliary frame relative to said main frame in response to said correction signal, to bring said actual position toward conformity with said desired position.

2. The method of claim 1, wherein the step of determining ultrasonically includes comparing the time for an ultrasonic signal to be sent to the ground from said transducer and reflected back, into the time for a fraction of the same signal to go to a shorter known distance and to be reflected back.

3. The method of claim 2 wherein the transducer is electrostatic.

4. The method of claim 1 in which the auxiliary frame is pivotally attached to the main frame, wherein said calculating includes multiplication by needed trigonometric and other constants in order to convert swinging movements to their vertical components.

5. An agricultural machine for field use where it is important to keep a machine member at a substantially constant height above the field, including in combination:

a wheel-supported main frame, an auxiliary frame carrying said machine member and supported by said main frame for generally vertical movement relative thereto, lifting-and-lowering means for lifting said auxiliary frame and said machine member therewith relative to said main frame, first transducer means for determining the position of said machine member relative to said main frame and developing a first electrical signal corresponding thereto, ultrasonic distance-determining means secured to an underside of said auxiliary frame above and spaced from said machine member and having a housing with the ultrasonic electrostatic second transducer connected to an electronic transmitter and to an electronic receiver, for determining ultrasonically the height of said second transducer above the field and for generating a second electrical signal corresponding thereto, setting means on said main frame for setting said machine member at an initial position relative to the surface of said field, from which initial position the actual relative position of said machine member diverges due to such things as field surface roughness, electronic calculation means electrically connected to said first and second transducer means and provided with trigonometric and other constants relating to the geometry of said auxiliary frame, its mounting to said main frame, its said lifting-and-lowering means, said machine member, and the location of said receiver, for determining the amount and direction of divergence of said actual position of said machine member relative to the field surface from its initial position relative thereto and producing an electrical correction signal corresponding thereto, and correcting means responsive to said correction signal for actuating said lifting-and-lowering means and thereby bringing said actual position toward conformity with said initial position.

6. A tomato harvester for use in a tomato field wherein tomato plants are grown in rows along a series of elevated beds, each bed lying between a pair of furrows, including in combination:

a wheel-supported main frame, a header frame pivotally supported by said main frame generally forward thereof, plant-stem-severing means at the forward and lowest edge of said header frame, plant pickup and elevating means on said header frame behind said plant-stem-severing means and extending upwardly and rearwardly therefrom, header-lifting means having a first power means connected to said main frame and to said header frame for swinging said header frame up in a vertical plane relative to said main frame, return being by gravity, first transducer means for determining the position of said header frame relative to said main frame and developing a first electrical signal corresponding thereto, ultrasonic distance-determining means secured to an underside of said header frame above and to the rear of said plant-stem-severing means and having electrostatic, ultrasonic, second transducer means, for determining ultrasonically the height of said receiver above the bed and for generating a second electrical signal corresponding thereto, a gauge frame pivotally supported by said header frame, a pair of gauge wheels rotatably supported on opposite sides of said gauge frame forward of the header frame, for riding in a pair of furrows between which a bed lies, gauge-frame-lifting-and-lowering power means mounted to said header frame and said gauge frame for swinging said gauge frame in a vertical plane relative to said header frame, means for placing said header frame in a free-floating condition during operation so that the gauge-frame-lifting-and-lowering power means determines the height of the header frame above ground and also relative to the main frame, electrically actuated means for controlling said gauge-frame-lifting-and-lowering power means for thereby raising and lowering of header frame relative to said gauge wheels when said gauge wheels ride on the ground in said furrows, setting means on said main frame acting on both said gauge-frame-lifting-and-lowering means for setting the plant-stem-severing means at a desired height relative to said gauge wheels and thereby initially setting said plant-stem-severing means at a desired level relative to the surface of a said bed, electronic calculation means electrically connected to said first and second transducer means and provided with trigonometric and other constants relating to the relative positions of said header frame with its pivot, the header-lifting-and-lowering means, the plant-stem-severing means, and said receiver, for determining the divergence between the actual position of said plant-stem-severing means relative to the bed surface and its desired position relative thereto and producing an electrical correction signal corresponding thereto, and correcting means responsive to said correction signal for actuation of said solenoid valve for bringing said actual position toward conformity with said desired position.

7. A tomato harvester for use in a tomato field wherein tomato plants are grown in rows along a series of elevated beds, each bed lying between a pair of furrows, including in combination:

a wheel-supported main frame, a header frame pivotally supported by said main frame generally forward thereof for swinging movement in a vertical plane relative to said main frame, a header-lifting first fluid power device having a first cylinder pivoted to said main frame and a first piston inside said cylinder with a first rod pivoted to said header frame, first valve means for supplying actuating fluid to said first fluid power device for lifting said header, return being by gravity upon release of said first valve means, said first valve means having a detented position placing the header frame in a free-floating condition, first transducer means for determining the position of said first piston in said first cylinder and developing a first electrical signal corresponding thereto and therefore to the position of said header frame relative to said main frame, a gauge frame pivotally supported by said header frame generally forward thereof for swinging movement in a vertical plane relative to said header frame, a gauge-frame-lifting-and-lowering second fluid power device having a second cylinder pivoted to said header frame and a second piston inside said second cylinder with a second rod pivoted to said gauge frame, a pair of gauge wheels rotatably supported on opposite sides of said gauge frame forward of the header frame, for riding in a pair of furrows between which a bed lies, second valve means for supplying actuating fluid to said second fluid power device and thereby raising and lowering said header frame relative to said gauge wheels when said gauge wheels ride on the ground in said furrows, solenoid means for operating said second valve means according to electrical energization of said solenoid means, control means for placing said first valve means in its said detented position so that said header is in a free-floating condition and said second power device determines the height of said header frame relative to the ground and to said main frame, plant-stem-severing means at the forward and lowest edge of said header frame, plant pickup and elevating means on said header frame behind said plant-stem-severing means and extending upwardly and rearwardly therefrom, distance-determining means secured to an underside of said header frame above and to the rear of said plant-stem-severing means and having a housing with electrostatic, ultrasonic, second transducer means, for determining ultrasonically the height of said receiver above the bed and for generating a second electrical signal corresponding thereto, setting means on said main frame acting on said second fluid power means for setting the plant-stem-severing means at an initial height of said plant-stem-severing means relative to said gauge wheels determined by a desired position of the plant-severing means relative to the surface of a said bed, said desired position thereafter necessarily tending to diverge from the actual position as the bed and furrows diverge from being perfectly level, electronic calculation means connected electrically to said first and second transducer means and provided with trigonometric and other constants relating to the geometry of said header frame with respect to its pivot, its first fluid power device, its plant-stem-severing means, and its said receiver, for determining the difference and direction of divergence of the actual position of said plant-stem-severing means relative to the bed surface from its desired position relative thereto and producing an electrical correction signal corresponding thereto, and correcting means responsive to said correction signal for actuating said solenoid means and thereby actuating said second valve means for causing said second fluid power means to bring said actual position into closer conformity with said desired position.

8. A tomato harvester for use in a tomato field wherein tomato plants are grown in rows along a series of elevated beds, each bed lying between a pair of furrows, including in combination:

a wheel-supported main frame having a pivot point, a header supported by said pivot for swinging movement in a vertical plane relative to said main frame, said header having a frame, plant-stem-severing means at its forward and lowest edge, and plant pickup and elevating means extending upwardly and rearwardly from said plant-stem-severing means, a header-lifting first fluid power device pivoted at one end to said main frame and at its other end to said header frame and having a first cylinder and a first piston inside said cylinder with a first rod, first valve means for supplying actuating fluid to said first fluid power device for lifting, return being by gravity, said first valve means having a detented position in which said header is in a free-floating condition, first transducer means for determining the position of said fist piston in said first cylinder and developing a first electrical signal corresponding thereto and therefore to the positions of said plant-stem-severing means relative to said pivot, distance-determining means secured to an underside of said header frame above and to the rear of said plant-stem-severing means and having a housing with electrostatic, ultrasonic, second transducer means, for determining ultrasonically the height of said receiver above the bed and for generating a second electrical signal corresponding thereto, a gauge frame pivotally supported for swinging movement in a vertical plane relative to said header frame, a pair of gauge wheels rotatably supported on opposite sides of said gauge frame forward of the header frame, for riding in a pair of furrows between which a bed lies, a gauge-frame-lifting-and-lowering second fluid device having a second cylinder pivoted to said header frame, a second piston inside said second cylinder having a second rod pivoted to said gauge frame, solenoid valve means for supplying actuating fluid to said second fluid device and thereby effectuating raising and lowering of said header frame relative to said gauge wheels when said gauge wheels ride on the ground in said furrows, control means on said main frame acting on said first valve means for placing it in its detented positon and on said second valve means for intitially setting the height of said plant-stem-severing means relative to said gauge wheels, electronic calculation means electrically connected to said first and second transducer means and provided with trigonometric constants relating to the geometry of said header with its pivot, its first fluid device, its plant-stem-severing means, and the location of said receiver, for determining the divergence between the actual position of said plant-stem-severing means relative to the bed surface and a desired position relative thereto and producing an electrical correction signal corresponding thereto, and correcting means responsive to said correction signal for actuating said solenoid valve and thereby bringing said plant severing means into closer conformity with its said desired position.

* * * * *